United States Patent
Cho

(10) Patent No.: US 8,626,190 B2
(45) Date of Patent: Jan. 7, 2014

(54) METHOD FOR LOCATION DETERMINATION OF WIRELESS DEVICE

(75) Inventor: Jeonghoon Cho, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 0 days.

(21) Appl. No.: 13/337,841

(22) Filed: Dec. 27, 2011

(65) Prior Publication Data
US 2012/0165042 A1 Jun. 28, 2012

(30) Foreign Application Priority Data
Dec. 27, 2010 (KR) .................. 10-2010-0135546

(51) Int. Cl.
H04W 24/00 (2009.01)
(52) U.S. Cl.
USPC .................. 455/456.1; 455/456.2
(58) Field of Classification Search
None
See application file for complete search history.

(56) References Cited

U.S. PATENT DOCUMENTS

| 6,285,314 B1* | 9/2001 | Nagatsuma et al. ...... 342/357.57 |
| 2009/0149200 A1* | 6/2009 | Jayasinghe et al. ......... 455/456.3 |
| 2010/0179757 A1* | 7/2010 | Iketani et al. ............... 701/214 |
| 2011/0054787 A1* | 3/2011 | Mayor et al. ................. 701/213 |

FOREIGN PATENT DOCUMENTS

| JP | 06-341847 A | 12/1994 |
| JP | 07-091976 A | 4/1995 |
| JP | 07-283808 A | 10/1995 |
| JP | 11-014734 A | 1/1999 |
| JP | 2001-074494 A | 3/2001 |
| JP | 2003-269973 A | 9/2003 |
| JP | 2003-284123 A | 10/2003 |
| JP | 2006-166421 A | 6/2006 |
| KR | 10-2009-0008960 A | 1/2009 |

OTHER PUBLICATIONS

Office Action dated Aug. 5, 2013 in Chinese Application No. 201110441803.7, filed Dec. 26, 2011.
Office Action dated May 31, 2013 in Japanese Application No. 2011-283394, filed Dec. 26, 2011.
Office Action dated Mar. 9, 2012 in Korean Application No. 10-2010-0135546, filed Dec. 27, 2010.

* cited by examiner

*Primary Examiner* — Erika A Washington
(74) *Attorney, Agent, or Firm* — Saliwanchik, Lloyd & Eisenschenk

(57) ABSTRACT

A method for location determination of a wireless device is disclosed, the method is performed by the wireless device mounted with a gyroscope sensor and receiving position information from artificial satellites, and a positioning period is adaptively adjusted based on degree of mobility of the wireless device using the position information received from GPS and a gyroscope sensor embedded in the wireless device.

11 Claims, 1 Drawing Sheet

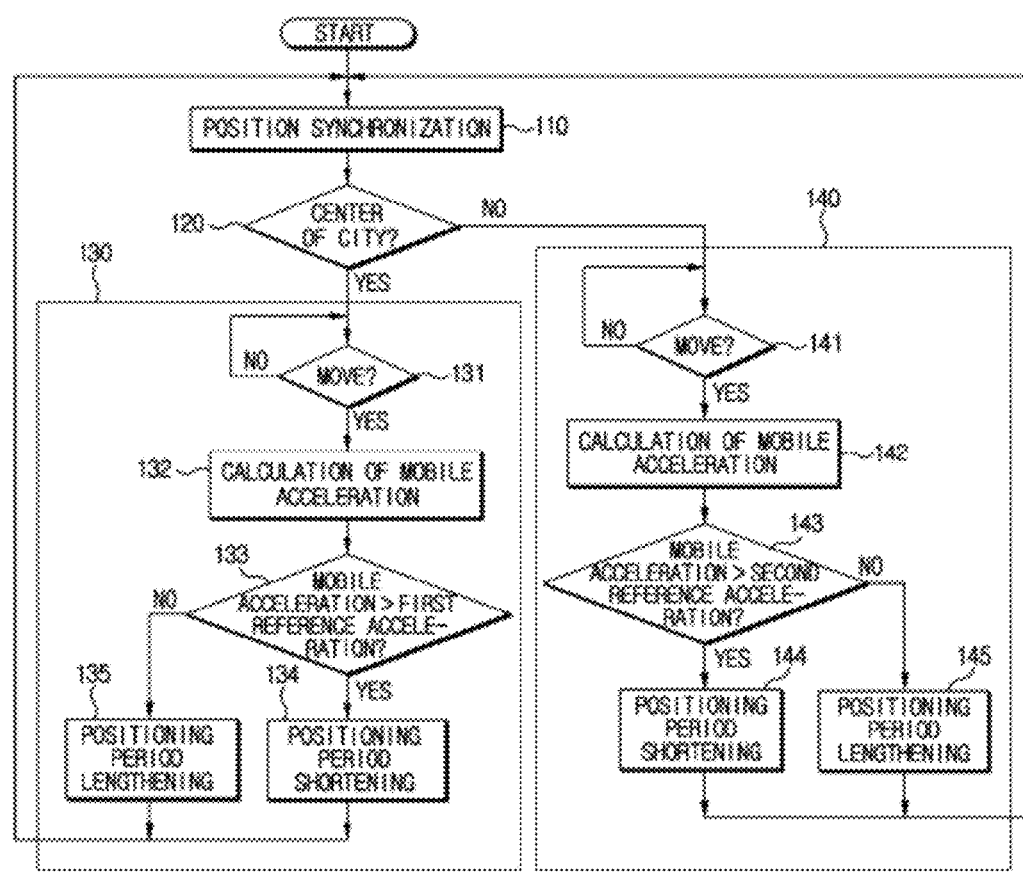

METHOD FOR LOCATION DETERMINATION OF WIRELESS DEVICE

CROSS-REFERENCE TO RELATED APPLICATION

This application claims the benefit under 35 U.S.C. §119 of Korean Patent Application No. 10-2010-0135546, filed Dec. 27, 2010, which is hereby incorporated by reference in its entirety.

BACKGROUND

1. Field of the Invention

Exemplary embodiments of the present disclosure may relate to a method for location determination of wireless device, and more particularly to a method for location determination of wireless device for use in GPS (Global Positioning System).

2. Description of the Related Art

A mobile communication system provides a location service for supplying a location of a terminal to a certain entity periodically or in response to a request, by including a relevant functional part for calculating the location of the terminal in a mobile communication network. Location based services (LBSs) refer generally to services that provide information to a user in relation to the location of the user.

That is, the LBSs are services in which a chip connected to a base station or GPS is attached to a mobile terminal to receive a variety of location-based services using location information about a mobile terminal or a user that include position tracking services, public safety services and position based information services.

To be more specific, the location based services (LBSs) refer generally to various services that provide information to a user in relation to the location of the user based on position information obtained through wired or wireless communication networks, and may be largely categorized into two methods, that is, a cell method using a mobile communication base station and a method using a GPS The cell method is disadvantageous due to difficulty in locating an accurate position as position error range can be over several kilometers, but advantageous due to easy location even to an interior of a building or to a basement because of using a relay system.

Satellite-based global positioning systems (GPS) can also be used to determine the location of mobile terminals. GPS solutions are generally more accurate (position error range being at most less than several hundred meters) than cell of origin methods but have restricted use when required to operate indoors where reflection and refraction are easy, due to characteristics of satellite signal.

BRIEF SUMMARY

The present disclosure is directed to solving the disadvantages by providing a method for location determination of a wireless device in which a positioning period is adaptively adjusted based on degree of mobility of the wireless device using position information received from GPS and a gyroscope sensor embedded in the wireless device, if need be.

Technical subjects to be solved by the present disclosure are not restricted to the above-mentioned description, and any other technical problems not mentioned so far will be clearly appreciated from the following description by the skilled in the art.

In one general aspect of the present disclosure, there is provided a method for location determination of a wireless device, the method performed by the wireless device mounted with a gyroscope sensor and receiving position information from GPS, the method comprising: (a) determining a position of a wireless device using the position information received from the GPS; (b) grasping a mobile acceleration of the wireless device using the gyroscope sensor if the device is located in the center of a city, and comparing a predetermined first reference acceleration with the mobile acceleration to update a positioning period of the device based on the comparative result; and (c) grasping a mobile acceleration of the wireless device using the gyroscope sensor if the device is located in the suburbs, and comparing a predetermined second reference acceleration with the mobile acceleration to update a positioning period of the device based on the comparative result.

Preferably, the method further includes (d) determining whether the device is located in the center of the city or in the suburbs.

Preferably, the step (d) includes determination using at least one of the numbers of base stations, cell radius and intensity of transmission signal from the base station.

Preferably, the step of (d) includes determining that the device is located in the center of a city if the numbers of base stations are larger than the predetermined reference numbers, and a cell radius is smaller than a reference radius, and determining that the device is located in the suburbs if the intensity of transmission signal from the base station is higher than a reference intensity.

Preferably, the step (b) includes (e) calculating a mobile acceleration of the wireless device, (f) determining whether a measured mobile acceleration is greater than the first reference acceleration, (g) lengthening the positioning period if it is determined that the measured mobile acceleration is smaller than the first reference acceleration, and (h) shortening the positioning period if it is determined that the measured mobile acceleration is greater than the first reference acceleration, and performing the step (a), following the completion of steps (g) and (h).

Preferably, the step (c) includes (i) calculating a mobile acceleration of the wireless device, (j) determining whether the measured mobile acceleration is greater than the second reference acceleration, (k) lengthening the positioning period if it is determined that the measured mobile acceleration is smaller than the second reference acceleration, and (l) shortening the positioning period if it is determined that the measured mobile acceleration is greater than the second reference acceleration, and performing the step (a), following the completion of steps (k) and (l).

Preferably, the first reference acceleration is smaller than the second reference acceleration.

Preferably, the calculation of the mobile acceleration is performed by the gyroscope.

Preferably, the step (a) is performed on top priority base if a user of the wireless device instructs the positioning.

In another general aspect of the present disclosure, there is provided a method for location determination of a wireless device, the method performed by the wireless device mounted with a gyroscope sensor and receiving position information from GPS, the method comprising: (a) determining a position of a wireless device using the position information received from the GPS; and (b) grasping a mobile acceleration of the wireless device using the gyroscope sensor, and comparing a predetermined reference acceleration with the mobile acceleration to update a positioning period of the device based on the comparative result.

Preferably, the step (b) includes (c) calculating a mobile acceleration of the wireless device, (d) determining whether a measured mobile acceleration is greater than the reference acceleration, (e) lengthening the positioning period if it is determined that the measured mobile acceleration is smaller than the reference acceleration, and (f) shortening the positioning period if it is determined that the measured mobile acceleration is greater than the reference acceleration, and performing the step (a), following the completion of steps (e) and (f).

Preferably, the calculation of the mobile acceleration is performed by the gyroscope.

Preferably, the step (a) is performed on top priority base if a user of the wireless device instructs the positioning.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

The method for location determination of a wireless device according to the present disclosure has advantageous effects in that large power-consuming network positioning and GPS positioning periods are adaptively adjusted based on degrees of stationary and mobility of the wireless device using a gyroscope sensor, whereby an overall power consumed by the wireless device can be minimized by minimally using a current consumed for positioning that uses a large amount of power. As a result, the use time of the wireless device can be considerably prolonged.

BRIEF DESCRIPTION OF THE DRAWING

Accompanying drawing is included to provide a further understanding of arrangements and embodiments of the present disclosure and is incorporated in and constitutes a part of this application.

FIG. 1 is a signal flowchart of a method for location determination of a wireless device according to the present disclosure.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the method particularly pointed out in the written description and claims hereof as well as the appended drawings.

DETAILED DESCRIPTION

Hereinafter, exemplary embodiments of the present disclosure are described in detail with reference to the accompanying drawings. It will be appreciated that for simplicity and/or clarity of illustration, elements illustrated in the FIGURE have not necessarily been drawn to scale. For example, the dimensions of some of the elements may be exaggerated relative to other elements for clarity. Further, if considered appropriate, reference numerals have been repeated among the FIGURES to indicate corresponding and/or analogous elements.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements.

Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In the following description and/or claims, the terms "comprise" and "include," along with their derivatives, may be used and are intended as synonyms for each other. Furthermore, the terms "including", "includes", "having", "has", "with", or variants thereof are used in the detailed description and/or the claims to denote non-exhaustive inclusion in a manner similar to the term "comprising".

The core idea of the present disclosure is to accurately recognize a position of a wireless device consuming less power, and to this end, GPS positioning of standalone method is periodically performed at normal times, and a mobility of the wireless device is grasped using the gyroscope sensor to adjust a positioning period based on the degree of mobility and to minimize a current consumed for positioning, and a handset-based A-GPS scheme consuming a large amount of power is minimally used in time of emergency.

Hereinafter, the description is made on a presumption that the wireless device can directly receive position information from satellites, and a gyroscope sensor is mounted on the wireless device.

FIG. 1 is a signal flowchart of a method for location determination of a wireless device according to the present disclosure.

Referring to FIG. 1, the method 100 for location determination of a wireless device according to the present disclosure includes the steps of positioning 110, determining an area to which the wireless device belongs 120, measuring a position in a center of a city 130, and measuring a position in suburbs 140.

The positioning step 110 determines a position of a wireless device using position information received from artificial satellites.

The step of determining an area to which the wireless device belongs 120 determines whether the wireless device is located in the center of city or in the suburbs using at least one of the numbers of base stations around the wireless device, cell radius and intensity of transmission signal from the base station.

In a case the numbers of base stations around the wireless device are larger than the numbers of predetermined references and the cell radius is smaller than a reference radius, it is determined that the wireless device is located in the center of the city, and in a case the intensity of transmission signal from the base station is higher than a reference strength, it is determined that the wireless device is positioned in the suburbs.

The step of measuring a position in a center of a city 130 is operated, if it is determined (Yes) that the wireless device is situated in the center of the city as a result of determination at the step 120, and includes a mobility determination step 131, an acceleration of the wireless device calculation step 132, an acceleration comparison step 133, a first positioning period adjusting step 134 and a second positioning period adjusting step 135.

The mobility determination step 131 determines the stationary state or mobile state of the wireless device using the gyroscope sensor. In a case the wireless device is determined to be in the stationary state (No), flow keeps determining at a predetermined time interval whether the wireless device is moving.

The acceleration of the wireless device calculation step 132 calculates the mobile acceleration of the wireless device if it is determined (Yes) that the wireless device moves as a result of the determination at the mobility determination step 131, where the mobility determination step 131 and the acceleration of the wireless device calculation step 132 may be commonly called a mobile acceleration measuring step, which is performed by the gyroscope sensor.

The acceleration comparison step 133 determines whether the calculated mobile acceleration of the wireless device is higher than a first reference acceleration.

The first positioning period adjusting step 134 shortens the positioning period to allow enabling an accurate positioning under a situation where the wireless device is expected to move fast, if it is determined (Yes) that the calculated mobile acceleration is greater than the first reference acceleration as a result of determination of the acceleration comparison step 133.

The second positioning period adjusting step 135 lengthens the positioning period to allow reducing power consumed for positioning, if it is determined (No) that the calculated mobile acceleration is smaller than the first reference acceleration as a result of determination of the acceleration comparison step 133.

The positioning step 110 is performed to update the position of the wireless device, following the completion of the first positioning period adjusting step 134. The positioning step 110 may be performed to update the position of the wireless device, or the wireless device may be kept at standby state whereby the current consumed for the wireless device can be minimized, following the completion of the second positioning period adjusting step 135.

The step of measuring a position in the suburbs 140 is operated, if it is determined (No) that the wireless device is situated in the suburbs as a result of determination at the step 120, and includes a mobility determination step 141, an acceleration of the wireless device calculation step 142, an acceleration comparison step 143, a third positioning period adjusting step 144 and a fourth positioning period adjusting step 145.

The mobility determination step (141) determines the stationary state or mobile state of the wireless device using the gyroscope sensor. In a case the wireless device is determined to be in the stationary state (No), flow keeps determining at a predetermined time interval whether the wireless device is moving.

The acceleration of the wireless device calculation step 142 calculates the mobile acceleration of the wireless device if it is determined (Yes) that the wireless device moves as a result of the determination at the mobility determination step 141, where the mobility determination step 141 and the acceleration of the wireless device calculation step 142 may be commonly called a mobile acceleration measuring step, which is performed by the gyroscope sensor.

The acceleration comparison step 143 determines whether the calculated mobile acceleration of the wireless device is higher than a second reference acceleration.

The third positioning period adjusting step 144 shortens the positioning period to allow enabling an accurate positioning under a situation where the wireless device is expected to move fast, if it is determined (Yes) that the calculated mobile acceleration is greater than the second reference acceleration as a result of determination of the acceleration comparison step 143.

The fourth positioning period adjusting step 145 lengthens the positioning period to allow reducing power consumed for positioning, if it is determined (No) that the calculated mobile acceleration is smaller than the second reference acceleration as a result of determination of the acceleration comparison step 143.

The positioning step 110 is performed to update the position of the wireless device, following the completion of the third positioning period adjusting step 144. The positioning step 110 may be performed to update the position of the wireless device, or the wireless device may be kept at standby state whereby the current consumed for the wireless device can be minimized, following the completion of the fourth positioning period adjusting step 145.

At this time, the first reference acceleration is set to smaller than the second reference acceleration. Although FIG. 1 includes the determination step 120, it should be apparent that the step 120 may not be included.

The position of a wireless device has been forcibly measured based on position measurement period according to the prior art, and as a result, the method of receiving the position information from the artificial satellites and determining the position of the wireless device by communicating with the base station consumed lots of power.

The use type of a wireless device depends on who owns the wireless device.

For example, it is assumed that an owner of a wireless device is an elementary school student. In a case the student acts 12 hours in a day, in consideration of commuting time and schedules after school, the student stays in the school for 6 hours at the minimum. Under this circumstance, measurement of position of the wireless device at every predetermined time would be waste of power. In this case, there would be no big problem even if the measuring period of position of the wireless device is lengthened.

Alternatively, if it is assumed that there occurs an emergency where the owner of the wireless device is kidnapped, and the wireless device is moving considerably faster than the normal moving speed (mobile acceleration), it would be imperative that the measuring period be shortened to secure an accurate measurement of the wireless device. The present disclosure satisfies the above two cases altogether.

INDUSTRIAL APPLICABILITY

Therefore, the method for location determination of a wireless device according to the present disclosure has an industrial applicability in that power consumption is relatively lower than the predetermined period positioning method to increase use efficiency of battery in case of need, because, the cell method that consumes a lot of power is dispensed with in measuring the position of a wireless device, and an embedded gyroscope sensor is instead employed to grasp the mobility of the wireless device, whereby the positioning period is adaptively adjusted based on the mobility.

Another industrial applicability is that accuracy and efficiency can be accomplished by preferentially receiving and displaying the position information from satellites and by inputting an instruction to the wireless device, if an owner of a wireless device wants to know his or her accurate position.

The measuring a moving distance using a gyroscope sensor and updating the position of wireless device is well known to the skilled in the art, such that there is no further redundant description thereto.

The above-mentioned method for location determination of a wireless device according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A method for location determination of a wireless device, the method performed by the wireless device having a gyroscope sensor and receiving position information from GPS, the method comprising:
    determining a position of the wireless device using the position information received from the GPS;
    determining, whether the wireless device is located in a city or in suburbs;
    grasping a first mobile acceleration of the wireless device using the gyroscope sensor if the wireless device is located in tithe city, and comparing a predetermined first reference acceleration with the first mobile acceleration to update a positioning period of the wireless device based on the comparative result; and
    grasping a second mobile acceleration of the wireless device using the gyroscope sensor if the wireless device is located in the suburbs, and comparing a predetermined second reference acceleration with the second mobile acceleration to update a positioning period of the wireless device based on the comparative result, the first reference acceleration being smaller than the second reference acceleration;
    wherein the determining whether the wireless device is located in a city or in suburbs includes determining that the wireless device is located in the city if number of base stations is larger than a predetermined reference number and a cell radius is smaller than a reference radius, and determining that the wireless device is located in the suburbs if intensity of transmission signals from the base stations is greater than a reference intensity.

2. The method of claim 1, wherein the grasping a first mobile acceleration comprises:
    calculating the first mobile acceleration of the wireless device,
    determining whether the first mobile acceleration is greater than the first reference acceleration,
    lengthening the positioning period when it is determined that the first mobile acceleration is smaller than the first reference acceleration,
    shortening the positioning period when it is determined that the first mobile acceleration is greater than the first reference acceleration; and
    determining a position of the wireless device using the position information received from the GPS.

3. The method of claim 2, wherein the calculating the first mobile acceleration is performed by the gyroscope sensor.

4. The method of claim 1, wherein the grasping a second mobile acceleration comprises:
    calculating the second mobile acceleration of the wireless device,
    determining whether the second mobile acceleration is greater than the second reference acceleration,
    lengthening the positioning period if it is determined that the second mobile acceleration is smaller than the second reference acceleration, and
    shortening the positioning period if it is determined that the second mobile acceleration is greater than the second reference acceleration, and
    determining a position of the wireless device using the position information received from the GPS.

5. The method of claim 4, wherein the calculating the second mobile acceleration is performed by the gyroscope sensor.

6. The method of claim 1, wherein the determining a position of the wireless device is performed on a top priority base if a user of the wireless device instructs the positioning.

7. A method for location determination of a wireless device, the method performed by the wireless device mounted with a gyroscope sensor and receiving position information from GPS, the method comprising:
    determining a position of the wireless device using the position information received from the GPS;
    determining that the wireless device is located in a city if number of base stations is larger than a predetermined reference number and a cell radius is smaller than a reference radius, and determining that the wireless device is located in suburbs if intensity of transmission signals from the base stations is greater than a reference intensity;
    grasping a mobile acceleration of the wireless device using the gyroscope sensor; and
    comparing a predetermined first reference acceleration with the mobile acceleration if the wireless device is located in the city, and comparing a predetermined second reference acceleration with the mobile acceleration if the wireless device is located in the suburbs to update a positioning period of the wireless device based on the comparative result.

8. The method of claim 7, wherein the comparing a predetermined first reference acceleration with the mobile acceleration comprises:

calculating the mobile acceleration of the wireless device, determining whether the mobile acceleration is greater than the predetermined first reference acceleration, lengthening the positioning period if it is determined that the mobile acceleration is smaller than the predetermined first reference acceleration, shortening the positioning period if it is determined that the mobile acceleration is greater than the predetermined first reference acceleration, and determining a position of the wireless device using the position information received from the GPS.

9. The method of claim 8, wherein the calculating the mobile acceleration is performed by the gyroscope sensor.

10. The method of claim 7, wherein the determining a position of the wireless device is performed on a top priority base if a user of the wireless device instructs the positioning.

11. The method of claim 7, wherein the comparing the predetermined second reference acceleration with the mobile acceleration comprises:

calculating mobile acceleration of the wireless device, determining whether the mobile acceleration is greater than the second reference acceleration, lengthening the positioning period if it is determined that the mobile acceleration is smaller than the second reference acceleration, shortening the positioning period if it is determined that the mobile acceleration is greater than the second reference acceleration, and determining a position of the wireless device using the position information received from the GPS.

* * * * *